Patented Dec. 24, 1940

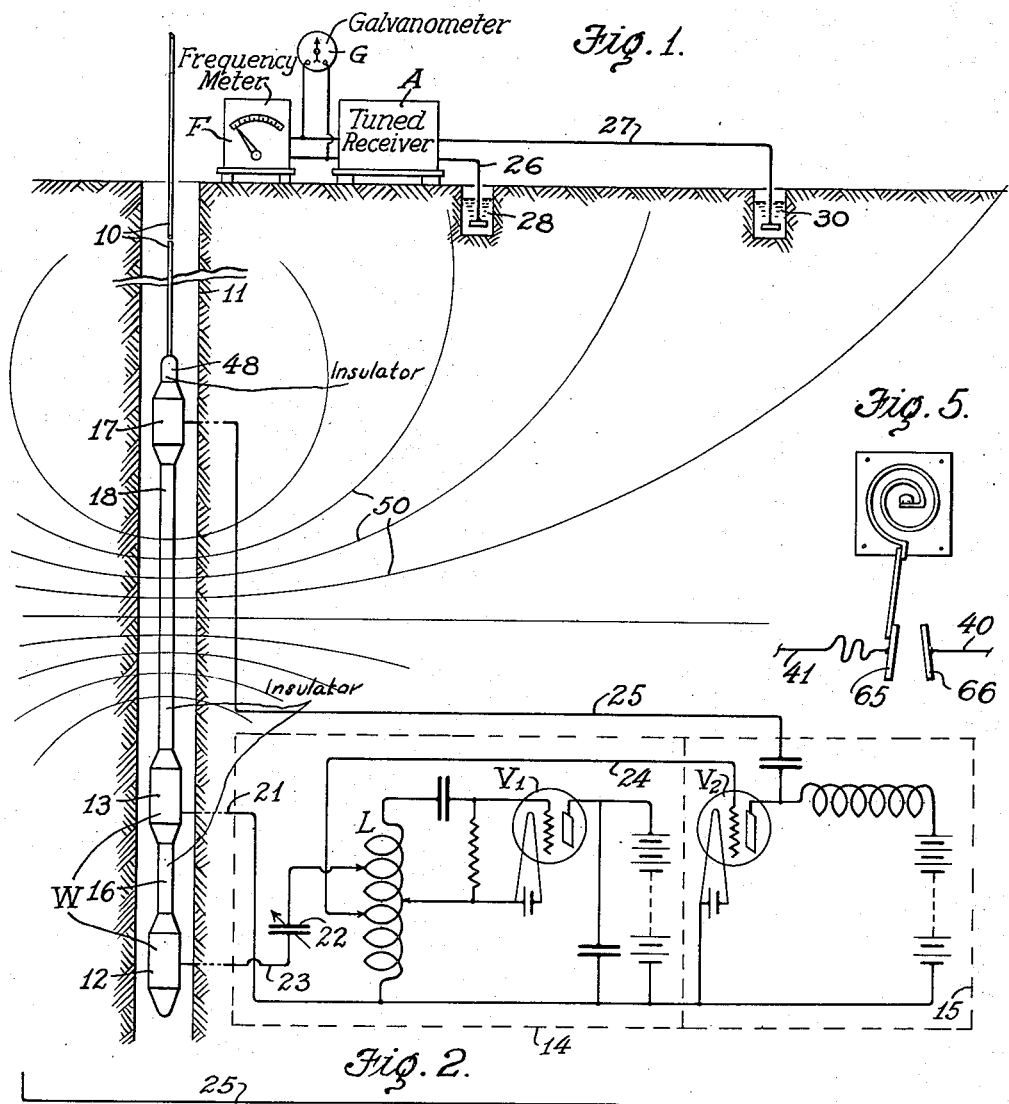
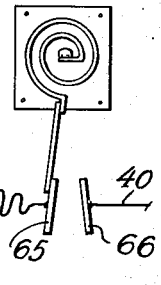
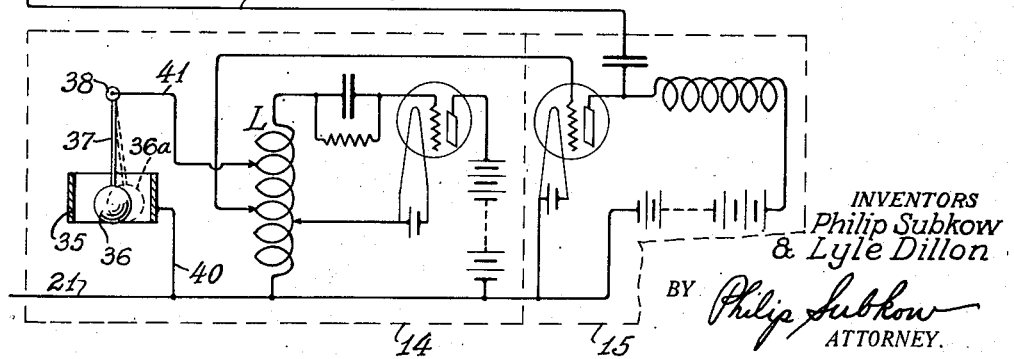

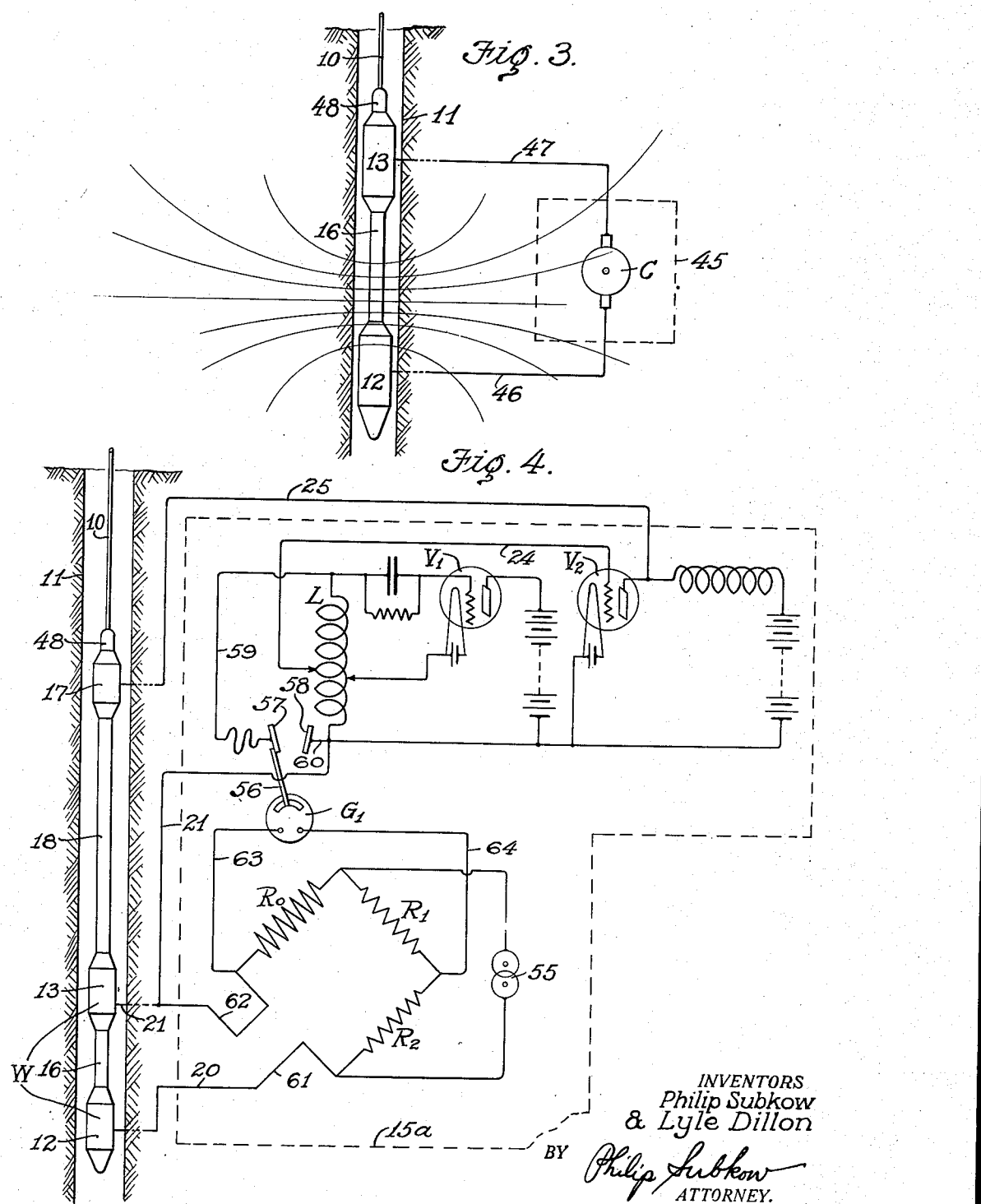

2,225,668

UNITED STATES PATENT OFFICE 2,225,668

METHOD AND APPARATUS FOR LOGGING DRILL HOLES

Philip Subkow, West Los Angeles, and Lyle Dillon, Los Angeles, Calif., assignors to Union Oil Company of California, Los Angeles, Calif., a corporation of California Application August 28, 1936, Serial No. 98,356

15 Claims. (Cl. 177—352)

This invention relates to drill hole testing and particularly to an electrical method and apparatus for the determination of the stratigraphy of earth bore holes such as oil wells.

The primary object of this invention is to provide a method and apparatus by which subsurface measurements of bore hole stratigraphy, pressure, temperature, inclination and the like can be made within the depths of the bore hole and by which these measurements can be continuously transmitted to the ground surface without the necessity of employing expensive and troublesome electrical connecting cables.

The broad invention accordingly resides in a method and apparatus for making physical measurements such as formation and fluid temperatures, pressures and electrical properties and bore-hole inclinations within the depths of a bore hole, transforming the measurements into variable oscillatory electrical currents which are proportional to or indicative in character of the said measurements, transmitting these currents through the fluid in the bore hole and through the surrounding formations to the earth surface, detecting and amplifying these currents at the surface and ascertaining, indicating or recording the said measurements in accordance with the character of the thus originated and detected oscillatory currents. The invention resides more specifically in a method and apparatus for measuring the electrical characteristics of the unitary portions of the penetrated formation strata within the depths of a bore hole such as an oil well, transferring these measurements into alternating electrical currents, the frequencies of which are functions of the said measurements, detecting, amplifying and measuring these electrical current frequencies received at the earth surface and determining therefrom the corresponding electrical measurment made within the bore hole.

Other objects and novel features of the invention will be evident hereinafter.

In the drawings, wherein typical embodiments of the invention are shown by way of illustration:

Fig. 1 is a diagrammatic sectional elevation of a well bore hole showing the general arrangement of the apparatus and electrical circuits employed for logging the dielectric properties of the penetrated formations.

Fig. 2 diagrammatically illustrates an alternative arrangement of the electrical circuits to be employed in the apparatus of Fig. 1, for determining bore hole inclinations.

Fig. 3 diagrammatically illustrates the partial sectional elevation of the well bore hole showing an alternative arrangement of apparatus for logging the electrical properties of the penetrated formations.

Fig. 4 is a diagrammatic partial sectional elevation of the well bore hole showing the general arrangement of apparatus and electrical circuits employed for logging electrical resistivities of the penetrated formations.

Fig. 5 diagrammatically illustrates a temperature operated element employed in the apparatus of Fig. 2 for determining bore hole temperatures.

The apparatus is as follows:

Referring to Fig. 1, W is an instrument adapted to be lowered by a suitable steel line or cable 10 into the earth bore hole 11. The instrument W comprises two liquid-tight hollow metallic cylinders 12 and 13 adapted to contain the electrical apparatus diagrammatically illustrated in the dotted enclosures 14 and 15. The cylinders 12 and 13 constitute two electrodes which are spaced and rigidly connected together by means of an interconnecting hollow insulating section 16. Directly above the cylinder 13 is a third electrode 17 with an interconnecting hollow insulating segment 18. The insulating segment 18 may comprise a tubular insulating member constructed of Bakelite, rubber, porcelain or the like with a solid metallic center, or it may comprise a flexible insulated cable of a type well known in bore hole testing work. The separation of the electrodes 13 and 17 may be in the order of 10 to 100 feet, while the separation of the electrodes 12 and 13 may be in the order of two or three feet.

The instrument W may be insulated from the supporting cable 10 by means of a strain insulator 48 which extends from the top of the cylinder 17. In some instances however, the cable or line 10 can be attached directly to the metal cylinder 17 with improved results.

Within the dotted enclosure 14 is illustrated electrical appaartus adapted to be enclosed in the cylinders 12 and 13 of the instrument W which is a conventional self-oscillating thermionic vacuum tube oscillatory circuit comprising an inductance L, a three-element vacuum tube $V_1$ and electrical apparatus commonly associated therewith. The cylinders 12 and 13 are electrically connected through conductors 23 and 21 and the series variable condenser 22 across a portion of the said inductance L. The cylindrical electrodes 12 and 13 thus constitute a variable capacitance in parallel with the inductance L, the combination of which in turn constitutes the frequency controlling elements of the oscillatory circuit. The electrical apparatus illustrated within the dotted enclosure 15 is also adapted to be housed in one of the cylinders 12 or 13 and comprises a thermionic vacuum tube amplifier conductively coupled through conductor 24 to the inductance L of the oscillatory circuit. The output of the said amplifier is connected across the electrodes 17 and 13 by means of conductors 25 and 21 respectively.

At the earth surface a tunable vacuum tube receiver and amplifier A and a frequency meter F are connected by means of conductors 26 and 27 of any suitable length to suitable ground connections in the earth surface 28 and 30 respectively. These ground connections 28 and 30 may be shallow holes filled with water or an electrolyte into which the conductors are placed, or the grounds may be in the form of metallic sheets of large area placed upon the surface of the ground or supported upon insulators a short distance thereabove. The distance between the ground connections 28 and 30 may be in the order of the depth of the well for picking up sufficient potential difference at the earth surface. In some cases a loop conductor such as a "loop antenna" supported above the ground surface, can be employed to pick up the alternating potential difference therein. The receiver A is preferably selective or tunable over the range of frequencies employed in the operation and includes an amplifier of the conventional vacuum tube design of great sensitivity. The frequency meter F is adapted to receive and indicate the frequencies or changes of frequencies of the current from the amplifier A.

Fig. 2 diagrammatically illustrates an optional arrangement of the electrical circuits and mechanism illustrated within the dotted enclosures 14 and 15 of Fig. 1 to be employed when bore hole inclinations are to be determined. The electrical circuits enclosed within the dotted enclosures 14 and 15 of Fig. 2 are similar to those in Fig. 1, except that the variable capacitance connected across a portion of the inductance L comprises a ring-shaped metallic surface 35 constituting one element of the variable capacitance and a pendulum 36 supported by rod 37 from a universal pivot 38 constituting the opposite element of the variable capacitance. These elements 35 and 36 are connected in shunt to a portion of the inductance L through the conductors 40 and 41, respectively. The ring electrode 35 is adapted to be rigidly supported within the cylinder 13 whereas the pendulum 36 is supported from the universal pivot 38 and is free to maintain a vertical position. Thus, the deviations of the instrument from the vertical will cause the pendulum 36 to swing with respect to the ring 35 and thus vary the effective electrical capacitance therebetween.

The output of the amplifier which is illustrated within the dotted enclosure 15 is electrically connected to the electrodes 17 and 13 through the conductors 25 and 21 respectively.

Fig. 3 diagrammatically illustrates apparatus adapted to be lowered into a well bore hole for the determination of subsurface stratigraphy comprising as in Fig. 1, two hollow metallic cylindrical electrodes 12 and 13 interconnected by means of a hollow insulating segment 16. A constant voltage, constant frequency electrical generator C is illustrated within the dotted enclosure 45, which is adapted to be enclosed in one of the hollow metallic electrodes. The generator C is electrically connected across the electrodes 12 and 13 by means of conductors 46 and 47 respectively. The supporting cable 10 may be insulated from the electrodes by means of an insulating segment 48.

In Fig. 4, the apparatus diagrammatically illustrated within the dotted enclosure 15a is, as in Fig. 1, enclosed within the steel cylinders 12 and 13 and is adapted to the measurement of electrical resistivities of unitary portions of surrounding bore hole formations adjacent the cylinders 12 and 13. In the electrical apparatus, B represents the four legs of a Wheatstone bridge with a low frequency alternating current source 55 connected across the two legs thereof and an alternating current galvanometer $G_1$ connected across the opposite two legs thereof. The alternating current supply is of such low frequency that inductance and capacitive effects of the bridge circuit and the formation being tested are negligible, the reversal of the current serving only to prevent undesirable electrode polarizing effects. The resistances $R_1$ and $R_2$ in the Wheatstone bridge may ordinarily be of equal value. The variable resistance $R_0$ is employed for balancing the bridge circuit against the average resistivity across the electrodes 12 and 13 when they are immersed in the fluid in the bore hole. As stated before, the electrodes 12 and 13 are separated by a hollow insulating rod 16.

The galvanometer G carries upon the end of its moving arm 56, which is a strip of insulating material, a metal plate 57. Adjacent the metal plate 57 and spaced a suitable distance therefrom, is a stationary plate 58 of similar size, the two plates 57 and 58 constituting the opposite elements of a variable capacity. These elements 57 and 58 are connected through the conductors 59 and 60 in shunt to the inductance L. The combination of the variable capacity formed by the plates 57 and 58 and the inductance L constitutes the frequency control portion of the conventional self-oscillating vacuum tube circuit. The self-oscillating vacuum tube circuit employing vacuum tube $V_1$ and the amplifier circuit employing vacuum tube $V_2$ comprise the same elements and apparatus described hereinbefore in connection with Fig. 1.

The operation is as follows:

As the apparatus W is lowered into the bore hole upon the supporting line 10 to make the logging test measurements, the electrodes 12 and 13 are brought into juxtaposition with the edges of penetrated strata which possess various dielectric properties. The variance in dielectric properties of the passing strata causes corresponding changes in the effective capacity between the cylindrical electrodes 12 and 13 in turn which, by being connected through conductors 20 and 21 and condenser 22 in shunt to a portion of the inductance L, controls and varies the signal frequency of oscillation of the thermionic vacuum tube oscillator illustrated in dotted enclosure 14. The variable condenser 22 serves to regulate and limit the amount of high frequency electrical power applied to the control electrodes 12 and 13 from the oscillatory circuit to that amount which will allow free and satisfactory oscillation. The adjustment of condenser 22 may be made prior to the final logging operations by trial test runs of the instrument into the bore hole. The variable condenser 22 also, together with adjustment of the value of the inductance L, serves to regulate the range of frequency variation of the oscillator.

The oscillatory circuit is preferably designed to generate high frequency alternating current of from 10,000 to several hundred thousand cycles a second. When frequencies of this order are thus applied to the control electrodes 12 and 13, the electrical circuits therebetween which comprise the unitary portions of the penetrated formations surrounding the electrodes and within the influence of the electrical field therebetween becomes largely capacitive in effect while the effect of ohmic resistance of the formations or fluids within the bore hole remains of a relatively low value. Hence, at these high frequencies, the effective capacity between the electrodes 12 and 13 will be predominantly influenced and varied by the dielectric properties of the passing penetrated strata. As the instrument moves through the bore hole, therefore, the frequency of the oscillator will vary in accordance with a function of the variations in the dielectric properties of the adjacent passing formation strata.

The oscillatory electrical current thus generated and controlled is impressed through the conductor 24 upon the vacuum tube amplifier which is illustrated in the dotted enclosure 15. The purpose of the vacuum amplifier is to obtain an oscillatory current of a frequency corresponding to that of the oscillator but of a much greater intensity than that which could be generated and directly controlled by the oscillator itself. The amplified output of the vacuum tube amplifier is impressed upon the electrodes 13 and 17 through the conductors 21 and 25 respectively. The electrodes 13 and 17 are separated at a greater distance than electrodes 12 and 13 by means of the insulating segment 18 in order to impress the amplified alternating current output across a greater length of subsurface strata whereby greater potential differences would thus be generated between points of given separation at remote points within the formations and at the ground surface. In other words, the greater the separation between the electrodes 13 and 17 for a given electrical potential impressed thereacross, the greater would be the induced potential difference at any two given contact points at the earth surface, such as, for example, earth connections 28 and 30. Lines 50 diagrammatically illustrate the approximate pattern of equipotential surfaces thus set up between the electrodes 13 and 17 and within the volume of subsurface formations and it is apparent that any two pickup contact points which do not both fall on the same equipotential surface will have induced potential differences therebetween which correspond exactly in frequency with that of the control oscillator and of an intensity proportional to the number of equipotential surfaces spanned.

Thus, it is apparent that two contact points well grounded in the earth surface as illustrated at 28 and 30 and having a separation distance which is in the order of the well depth, will have induced thereacross a small alternating potential difference which may be transmitted through the conductors 26 and 27 to the tuned receiver and amplifier A. The receiver A is preferably adjustable to the frequency of the received alternating current, for, under such conditions, it has maximum sensitivity for the desired signal frequency and a maximum rejection of extraneous and undesirable noises. The amplified alternating current from the receiver A is conducted to the frequency meter F which is any suitable apparatus capable of detecting frequency changes and/or measuring the frequencies of the received currents. Such a frequency meter may be of the well known type commonly known as a wave meter. Since the received amplified and measured frequencies at the surface correspond exactly with those originated at the oscillator within the bore hole, changes in the electrical properties of unitary portions of penetrated formations passed by the instrument W in its motion through the bore hole will become determinable at the ground surface. The frequency meter F may thus be calibrated to read directly in formation dielectric constants or in units which are proportional to or a function of said formation dielectric properties.

It is not necessary in bore hole logging to obtain a reading which is an absolute value of the dielectric property of the penetrated formation, it being necessary only to obtain indications of changes in the relative dielectric properties of the adjacent penetrated strata throughout the length of the bore hole. Such indications of relative changes in the dielectric properties of the strata become, with experience with the process, familiarity with the apparatus, and empirical correlation with known dielectric properties of known formations, a sufficient indication of the character of the formations with which the relative indicated changes correspond.

The hereinbefore described process and apparatus is not only applicable to the determination of subsurface bore hole stratigraphy, but is also applicable to the determination of bore hole inclinations, pressures and temperatures, and formation and fluid resistivities.

Fig. 2 diagrammatically illustrates apparatus adapted to the determination of inclination or the deviation from the vertical of remote portions of earth bore holes such as oil wells. Here the oscillatory and amplifier portions of the circuits illustrated within the dotted enclosures 14 and 15 are identical to those illustrated in Fig. 1. However, instead of varying the frequency of the oscillator, by means of changes in dielectric properties of formations, the frequency change is controlled by means of a gravity operated variable capacity comprising a metal ring 35 constituting one element of a variable capacity and a pendulum 36 constituting the opposite element of a variable capacity. The ring element 35 is rigidly supported within the hollow metal cylinder 13 while the pendulum 36 is supported at the end of an arm 37 upon a universal pivot 38. As the instrument moves into a portion of the bore hole which deviates from the vertical the pendulum 36 being free to remain in a vertical attitude will move toward the inside surface of the ring 35 to a position as illustrated in dotted outline 36a. The distance of the pendulum 36 from the ring 35 will thus obviously be a function of the angular deviation of the instrument from the vertical and hence the effective electrical capacity therebetween will also be a like function. Since the variable capacity elements 35 and 36 are connected in shunt through conductors 40 and 41 to a portion of the inductance L the output of the oscillator will accordingly correspond in frequency to a function of the instrument inclination from the vertical.

The amplified oscillatory current thus controlled by the instrument inclination is impressed upon the electrodes 13 and 17 through the conductors 21 and 25 and the resulting potential differences at the earth surface detected, amplified and measured as described hereinbefore in connection with the operation of Fig. 1, whereby changes in deviation from the vertical of the instrument within the bore hole is determined at the surface. By empirical calibration the frequency meter F may obviously be made to read directly in degrees of inclination of said instrument W within the bore hole.

The determination of the dielectric properties of the unitary portions of penetrated strata within earth bore holes can also be determined by means of the apparatus illustrated in Fig. 3 used in conjunction with the surface receiving and amplifying apparatus of Fig. 1. The subsurface apparatus of Fig. 3 differs from that illustrated in Fig. 1 in that it employs two metallic cylindrical electrodes 12 and 13 only separated by a suitable hollow insulating segment 16. The apparatus is supported and moved through the bore hole by the line 10 as before. The generator C illustrated within the dotted enclosure 45 may be of any suitable type adapted to generate a high frequency alternating current of constant potential and constant frequency. This generator, along with suitable driving means, is housed within one of the metal cylinders 12 or 13 and may comprise a vacuum tube oscillatory circuit of fixed frequency characteristics similar to that illustrated within the dotted enclosures 14 and 15 of Fig. 1. As the instrument is lowered through the bore hole, potential differences are set up throughout the surrounding formation, equipotential surfaces of which are illustrated approximately by lines 51. Variations in the dielectric properties of penetrated formations brought into juxtaposition with the electrodes 12 and 13 by their motion through the bore hole causes changes in the potential differences between any two given points within the surrounding formation or at the earth surface. Thus, as the said instrument moves through the bore hole variations in the induced potential differences between the grounded pickup electrodes 28 and 30 occur. By measuring the relative changes in the potential differences between the earth electrodes 28 and 30, by means such as a galvanometer G connected to the output of the tuned receiver amplifier A, indications of changes in the dielectric proportions of the unitary portions of penetrated formations within the bore hole are obtained at the earth surface.

When fluid temperature measurements are made within the bore hole a variable capacity comprising movable plates 65 and 66 in electrostatic relationship with one another operated by means of a bimetal element thermometer as shown in Fig. 5 is substituted for the pendulum and ring as shown in Fig. 2. The frequency of the oscillator is then varied in accordance with temperature changes within the bore hole and these temperatures are thus determinable at the earth surface. In this case the frequency meter F may be calibrated to read directly in degrees. The thermometer is preferably placed in the instrument W to be lowered into the bore hole in a position to readily partake of the temperature of the surrounding drilling fluid and formations.

When it is desired to measure bore hole pressures, a pressure operated variable capacity is likewise employed and the frequency meter F may, when making pressure measurements, be calibrated to read directly in pounds per square inch.

When formation or fluid resistivity measurements are made within the bore hole by the apparatus of Fig. 4, the resistance $R_0$ in the Wheatstone bridge B is adjusted to such a value that for all of the ranges of measured formation resistivities the range of motion of the galvanometer G due to the resulting unbalance of the Wheatstone bridge will be satisfactory and give the proper range of capacity variations by motion of the plates 67 and 68. This adjustment may be extended by preliminary test runs in an artificial bore hole containing drilling mud of the type employed in the well to be tested or by short preliminary runs within the actual bore hole to be tested.

As the testing apparatus, after the proper adjustment has been made, is lowered into the bore hole, and as the metal surfaces of the cylinders 12 and 13 which constitute the testing electrodes which are in turn connected through lines 61 and 62 respectively to one leg of the Wheatstone bridge B, the variation in resistivity thereacross due to the resistance changes in the adjacent formations upon motion of the apparatus through the bore hole, result in a change of balance of the Wheatstone bridge B. This change of balance results in changes of current flow through the conductors 63 and 64 from generator 55 resulting in motion of the elements of the galvanometer G. This motion of the elements of the galvanometer G will cause, throughout the connecting arm 56, relative motion of the plates 57 and 58 and thereby effect changes in the effective capacity in shunt to the inductance L. Since the capacity formed by the condenser plates 57 and 58 and the inductance L constitutes the frequency control element of the vacuum tube oscillator, the frequency of the output electrical current therefrom will be varied in accordance with a function of the said resistivity changes between the electrodes 12 and 13.

The alternating current output of the thus controlled vacuum tube oscillator is impressed through the connecting conductor 24 upon the vacuum tube amplifier, which comprises the vacuum tube $V_2$ and its associated electrical circuits. The purpose of the vacuum tube amplifier, as described hereinbefore in connection with Fig. 1, is to obtain an oscillatory current of a frequency corresponding to that of the oscillator but of a much greater intensity than that which could be generated and directly controlled by the oscillator itself. The amplified output of the vacuum tube amplifier is as before described in connection with Fig. 1, impressed upon the electrodes 13 and 17 through the conductors 21 and 25 respectively.

While vacuum tubes have been illustrated as the means by which the high frequency alternating currents are generated, other means may obviously be employed. For example, electrical buzzers, generators and other mechanical devices suitably controlled by the variable conditions within the bore hole may be similarly employed.

In Figs. 1 and 2, a self-excited thermionic vacuum tube oscillator and a single stage of amplification have been illustrated. Other oscillatory circuits and additional stages of amplification may obviously be employed where the bore hole depths to be tested require greater potential differences to be induced within the formation in order to maintain the required detectable potential differences at the grounded pickup electrodes at the earth surface.

The controlled oscillator or signal frequencies employed preferably range from approximately 10,000 to 100,000 vibrations per second, the frequencies preferably being above audibility, whereby extraneous undesirable noises which might interfere with making the proper readings are largely eliminated from the receiving apparatus. These frequencies from an electrical standpoint are relatively low and therefore large values of inductance and capacity in the variable electrical circuits are necessary. For this reason, it is desirable to employ means not only to vary the capacities but also to vary the inductances of the oscillatory circuits as well. Such variation of a large inductance may be accomplished by suitably controlled variable electromagnetic circuits associated with the inductances in a well known manner.

The foregoing is merely illustrative of a method and apparatus of the invention and it is not intended to be limiting. The invention includes any method and apparatus which accomplishes the same results within the scope of the claims.

We claim:

1. A method for transmitting indications of physical conditions within an unencased bore hole containing conductive fluid such as drilling mud through the earth surface comprising generating an oscillating electric current within the bore hole, impressing said oscillating electric current upon a pair of electrodes spaced longitudinally with respect to the axis of the bore hole in contact with the fluid in said bore hole whereby an oscillatory potential gradient is induced in the surrounding formations which extends to the earth surface and detecting said oscillatory potential gradient at the earth surface.

2. A method for transmitting indications of physical conditions within an unencased bore hole containing conductive fluid such as drilling mud to the earth surface comprising generating an oscillating electric current within the bore hole, varying the character of said electric current as a function of the changes of the physical conditions therein, impressing said electric current upon a pair of electrodes spaced longitudinally with respect to the axis of the bore hole in contact with the conductive fluid in said bore hole whereby an oscillatory potential gradient is induced in the surrounding formations which extends to the earth surface and detecting said oscillatory potential gradient at the earth surface whereby the indications of the said physical conditions within the bore hole can be determined.

3. A method for transmitting indications of physical conditions within an unencased bore hole containing conductive fluid such as drilling mud to the earth surface comprising generating an oscillating electric current within the bore hole of a frequency which is a function of the changes of the physical condition therein, impressing said oscillating electric current upon a pair of electrodes spaced longitudinally with respect to the axis of the bore hole in contact with the conductive fluid in said bore hole, whereby an oscillatory potential gradient is induced in the surrounding formations whch extends to the earth surface and detecting said oscillating potential gradient at the earth surface whereby the indications of the physical conditions within the bore hole can be determined.

4. A method for logging an unencased bore hole containing a drilling fluid comprising generating an alternating electrical current within the bore hole, varying the character of said electric current as a function of the electrical properties of unitary portions of the formations surrounding the bore hole, impressing the said electrical current upon a pair of electrodes spaced longitudinally with respect to the axis of the bore hole in contact with the fluid within the bore hole whereby a potential gradient is induced in the surrounding formations which extends to the earth surface and detecting said potential gradient at the earth surface whereby indications of the relative electrical properties of the unitary portions of the penetrated formations may be obtained at the earth surface.

5. A method of logging an unencased bore hole containing a drilling fluid comprising generating an alternating electric current within the bore hole, varying the frequency of said electric current as a function of the electrical properties of unitary portions of the formations surrounding the bore hole, impressing the said electric current upon a pair of electrodes spaced longitudinally with respect to the axis of the bore hole in contact with the fluid within the bore hole whereby an alternating potential gradient is induced in the surrounding formations which extend to the earth surface and detecting said alternating potential gradient at the earth surface whereby indications of the relative electrical properties of the unitary portions of the penetrated formations may be obtained at the earth surface.

6. A method of logging an unencased bore hole containing drilling fluid comprising lowering an instrument which is sensitive to electrical properties of unitary portions of the surrounding formations through the fluid in the bore hole, generating an alternating current within the instrument in the bore hole, controlling the character of said generated alternating current in accordance with a function of changes of the electrical properties of the unitary portions of the surrounding formations as the instrument moves through the bore hole, impressing the thus controlled electric current upon a unitary portion of the fluid in the bore hole whereby an alternating potential gradient is induced in the surrounding formations which extends to the earth surface and detecting and measuring the changes of the character of the alternating current at the earth surface, which changes in character correspond to the said function of the changes of the electrical properties of the unitary portions of the formation surrounding the bore hole.

7. A method of logging an unencased bore hole containing conductive drilling fluid comprising lowering an instrument which is sensitive to electrical properties of unitary portions of the surrounding formations through the fluid in the bore hole, generating an alternating current within the instrument in the bore hole, controlling the frequency of said alternating current by said instrument in accordance with a function of changes of the electrical properties of the unitary portions of the surrounding formations as the instrument moves through the bore hole, impressing said alternating electric current upon a portion of the conductive fluid in contact with the penetrated formations within the bore hole whereby an alternating potential gradient is induced in the surrounding formations which extends to the earth surface and detecting and measuring the changes of the frequency of the thus controlled alternating potential gradient at the earth surface which frequency changes correspond to the said function of the changes of the electrical properties of the unitary portions of the formation surrounding the bore hole.

8. A method for transmitting indications of the pressure within a bore hole comprising generating an alternating current in the bore hole, controlling said alternating current in accordance with a function of the pressure conditions therein, impressing the thus controlled alternating current upon a pair of electrodes in contact with the fluid in said bore hole whereby an alternating potential gradient is induced in the surrounding formations which extends to the earth surface, and detecting said alternating potential gradient at the earth surface whereby the indication of the said pressure within the bore hole can be determined.

9. Apparatus for transmitting indications of physical conditions within a bore hole to the earth surface comprising an instrument adapted to be lowered into a well bore hole, said instrument comprising means for generating an alternating electric current, means to control the character of said alternating current in accordance with the function of the said physical conditions to be measured within the bore hole, a pair of electrodes placed longitudinally with respect to the axis of the bore hole and adapted to make contact with the fluid in the bore hole, means to impress said electric current upon said electrodes whereby an alternating potential gradient may be induced in the surrounding formations which extends to the earth surface and means for detecting said alternating potential gradient at the earth surface.

10. Apparatus for transmitting indications of the electrical properties of unitary portions of the penetrated formations surrounding an unencased bore hole containing conductive fluid comprising an instrument adapted to be lowered into the well bore hole through the fluid, said instrument comprising an alternating current generator, means to vary the frequency of the alternating current generator in accordance with the function of variations in electrical properties of unitary portions of penetrated formations surrounding the bore hole as the instrument moves therethrough, means to impress the thus controlled alternating current from the generator upon the said conductive fluid in the bore hole and upon the adjacent formations surrounding the bore hole, whereby a corresponding potential gradient is induced at the earth surface, means to detect and amplify the said corresponding alternating current potential at the earth surface and means capable of indicating changes in the said amplified alternating current frequency.

11. Apparatus according to claim 10 with means to vary the frequency of the alternating current generator in accordance with the function of the variations in dielectric properties of the unitary portions of the penetrated formations surrounding the bore hole.

12. Apparatus according to claim 10 with means to vary the frequency of the alternating current generator in accordance with a function of the resistivities of the unitary portions of the penetrated formations surrounding the bore hole.

13. Apparatus according to claim 9 with means to vary the character of the alternating electric current in accordance with a function of variations in fluid pressure within the bore hole.

14. Apparatus according to claim 10 in which the alternating current generator comprises a thermionic vacuum tube oscillator.

15. Apparatus for transmitting indications of the electrical properties of unitary portions of the penetrated formations surrounding an unencased bore hole containing conductive fluid comprising an instrument adapted to be lowered into a well bore hole, said instrument comprising an alternating current generator, a pair of electrodes longitudinally spaced with respect to the axis of the bore hole and in effective electrical contact with the said fluid in the bore hole, means associated with said pair of electrodes to control the frequency of the said alternating current generator in accordance with a function of the variations in electrical properties of unitary portions of the penetrated formations surrounding the bore hole and adjacent said pair of electrodes as the instrument moves therethrough, a third electrode in contact with the said fluid in the bore hole, means to impress the alternating current of controlled frequency from the generator upon said third electrode and in said fluid whereby an alternating potential gradient may be induced in the surrounding formations which extends to the earth surface and means to detect said alternating current potential gradient at the earth surface.

PHILIP SUBKOW.
LYLE DILLON.